US010490838B2

(12) United States Patent
Brousseau et al.

(10) Patent No.: US 10,490,838 B2
(45) Date of Patent: Nov. 26, 2019

(54) FUEL CELL DEVICE AND METHOD OF MANAGING MOISTURE WITHIN A FUEL CELL DEVICE

(71) Applicant: Audi AG, Ingolstadt (DE)

(72) Inventors: Guillaume Michael Kurczko Brousseau, Woodstock, CT (US); Maura M. Vigliano, West Springfield, MA (US); David A. Niezelski, Manchester, CT (US); Sushant S. Bhadange, Vernon, CT (US)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 13/705,448

(22) Filed: Dec. 5, 2012

(65) Prior Publication Data
US 2014/0154605 A1 Jun. 5, 2014

(51) Int. Cl.
*H01M 8/24* (2016.01)
*H01M 8/2475* (2016.01)
*H01M 8/2465* (2016.01)

(52) U.S. Cl.
CPC ....... *H01M 8/2475* (2013.01); *H01M 8/2465* (2013.01); *Y10T 156/10* (2015.01)

(58) Field of Classification Search
CPC ........ H01M 8/2475; H01M 8/24; H01M 8/10; H01M 2/00; H01M 4/02; H01M 4/94; H01M 8/0286; H01M 8/2465; Y10T 156/10
USPC ............................................ 156/60; 429/535
See application file for complete search history.

(56) References Cited

U.S. PATENT DOCUMENTS

| | | | | |
|---|---|---|---|---|
| 2,367,953 A | * | 1/1945 | Lloyd | B60K 15/03177 220/62.11 |
| 2,679,677 A | * | 6/1954 | Crandall | H01B 3/084 139/383 R |
| 2,707,204 A | * | 4/1955 | Richardson | H01B 3/04 156/55 |
| 2,797,731 A | * | 7/1957 | Carlson, Jr. | B29C 63/06 138/DIG. 9 |
| 3,033,724 A | * | 5/1962 | Stokes | B29C 63/105 138/129 |

(Continued)

FOREIGN PATENT DOCUMENTS

| | | |
|---|---|---|
| JP | 2004146100 A | 5/2004 |
| JP | 2005-285744 A | 10/2005 |

(Continued)

OTHER PUBLICATIONS

International Search Report and Written Opinion of the International Searching Authority for International application No. PCT/US2013/072550 dated Mar. 21 2014.

(Continued)

*Primary Examiner* — Michael L Dignan
(74) *Attorney, Agent, or Firm* — Seed IP Law Group LLP

(57) ABSTRACT

An exemplary fuel cell device includes a cell stack assembly having a plurality of fuel cells. A vapor barrier tape is wrapped around at least a portion of an exterior of the cell stack assembly. An exemplary method of managing moisture within a fuel cell stack assembly includes covering at least a portion of an exterior of the cell stack assembly with a vapor barrier tape to thereby maintain moisture within the cell stack assembly.

9 Claims, 1 Drawing Sheet

(56) References Cited

U.S. PATENT DOCUMENTS

| | | | |
|---|---|---|---|
| 3,577,314 A * | 5/1971 | Evans | B64D 37/02 244/135 B |
| 4,345,009 A | 8/1982 | Fahle et al. | |
| 4,736,552 A * | 4/1988 | Ward | E04B 1/642 52/309.13 |
| 5,167,352 A * | 12/1992 | Robbins | B65D 90/501 220/62.2 |
| 6,322,920 B1 * | 11/2001 | Tomson | H01M 8/2475 429/1 |
| 7,135,247 B2 | 11/2006 | Meyers et al. | |
| 7,537,855 B2 | 5/2009 | Cho et al. | |
| 7,887,974 B2 * | 2/2011 | Osenar | H01M 8/0286 429/513 |
| 2006/0105219 A1 | 5/2006 | Anderson | |
| 2006/0199061 A1 | 9/2006 | Fiebig et al. | |
| 2006/0228606 A1 * | 10/2006 | Fiebig | H01M 8/0297 429/410 |
| 2007/0007141 A1 * | 1/2007 | Maeda | H01M 8/2465 205/57 |
| 2010/0154967 A1 * | 6/2010 | Segur | B32B 7/12 156/60 |
| 2010/0279065 A1 * | 11/2010 | Schroer | B32B 33/00 428/138 |
| 2011/0212380 A1 * | 9/2011 | Andreas-Schott | H01M 8/0271 429/469 |

FOREIGN PATENT DOCUMENTS

| | | |
|---|---|---|
| JP | 2008-310990 A | 12/2008 |
| JP | 2010-92850 A | 4/2010 |
| JP | 2010-129435 A | 6/2010 |
| JP | 2010244728 A | 10/2010 |
| WO | 2006112833 A1 | 10/2006 |

OTHER PUBLICATIONS

Asahara et al., "Crosslinked acrylic pressure sensitive adhesives. 3. Effect of adherend on film formation," *Polymer* 45: 4917-4924, 2004.

Extended European Search Report, dated Jun. 16, 2016, for European Application No. 13860438.4—1373 / 2929584, 10 pages.

* cited by examiner

FUEL CELL DEVICE AND METHOD OF MANAGING MOISTURE WITHIN A FUEL CELL DEVICE

BACKGROUND

Fuel cells facilitate an electrochemical reaction for generating electricity. Many fuel cell arrangements include porous plates that remain moist during fuel cell operation. Under idle conditions, it is possible for those plates to lose moisture as water vapor passes through their outer surfaces. Moisture loss from a fuel cell assembly can result in dry out of components such as water transport plates. It is desirable to maintain moisture within such components to ensure that the different fluid flows within the fuel cell assembly are sealed off from each other.

One approach at maintaining appropriate moisture for fuel cell components includes humidifying those components or introducing water into the system. While these approaches can be effective, they require additional steps to be taken, they require introducing additional water into the system, and they typically require some pump operation.

SUMMARY

An exemplary fuel cell device includes a cell stack assembly having a plurality of fuel cells. A vapor barrier tape is wrapped around at least a portion of an exterior of the cell stack assembly.

An exemplary method of managing moisture within a fuel cell stack assembly includes covering at least a portion of an exterior of the cell stack assembly with a vapor barrier tape to thereby maintain moisture within the cell stack assembly.

The various features and advantages of a disclosed example will become apparent to those skilled in the art from the following detailed description. The drawings that accompany the detailed description can be briefly described as follows.

DETAILED DESCRIPTION

Figure 1:
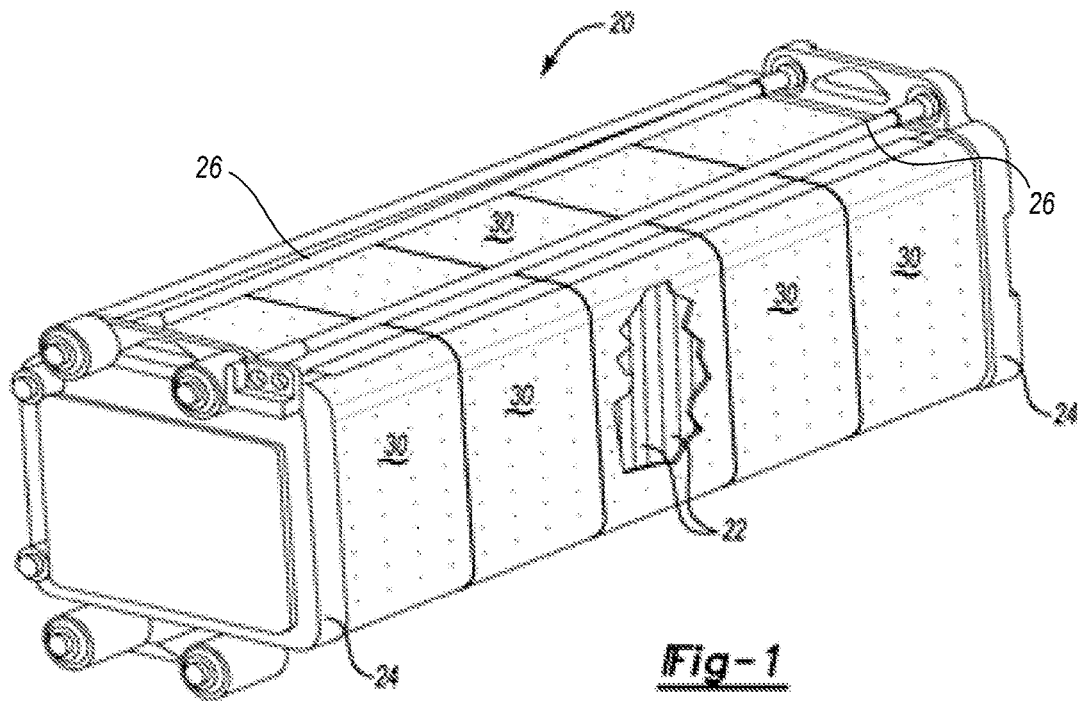
FIG. 1 diagrammatically illustrates an example fuel cell device designed according to an embodiment of this invention.

FIG. 1 shows a fuel cell device that includes a cell stack assembly (CSA) 20. A plurality of individual fuel cell units 22 are arranged adjacent to each other in a known manner. End caps 24 facilitate holding the fuel cell units 22 in the desired alignment. Connector rods 26 are provided in this example for holding the CSA 20 together.

At least some of the exterior of the CSA 20 is covered with a vapor barrier tape 30 for maintaining moisture within the CSA 20. In this example, the vapor barrier tape 30 is wrapped around the exterior surface of the fuel cell units 22. In the illustrated example, the vapor barrier tape 30 covers over the entire exterior surface of the fuel cell units 22 along the entire length of the CSA 20.

In the illustrated example, the CSA 20 has a generally rectangular configuration with four exterior side surfaces. All four of those side surfaces are covered with the vapor barrier tape 30 in this example. Other cell stack assemblies may have a different geometry. One feature of using a vapor barrier tape such as the illustrated tape 30 allows for covering a variety of fuel cell exterior configurations.

In the illustrated example, the vapor barrier tape 30 is wrapped around the exterior side surfaces of the CSA 20. In the illustrated example, a width of the vapor barrier tape 30 is less than an overall width or length of the CSA 20. Accordingly, multiple strips or segments of the vapor barrier tape 30 are applied to the CSA 20 to provide moisture control along the desired portion of the CSA 20. As can best be appreciated in FIG. 2, adjacent segments or strips of the vapor barrier tape 30 have edges 34 and 36 that are positioned relative to each other such that each of the segments of the vapor barrier tape 30 at least partially overlaps an adjacent segment. This overlap ensures an appropriate vapor barrier seal along the entire length of the CSA 20.

The vapor barrier tape 30 is hydrophobic and does not absorb moisture. In one example, the vapor barrier tape 30 comprises a polytetrafluoroethylene material and inherently includes pores.

Vapor barrier tapes used in some examples include a pressure sensitive adhesive for being adhesively secured to the exterior of the CSA 20. One example includes an acrylic adhesive. Given this description, those skilled in the art will realize what adhesives will work for their particular CSA configuration and material composition.

Figure 2:
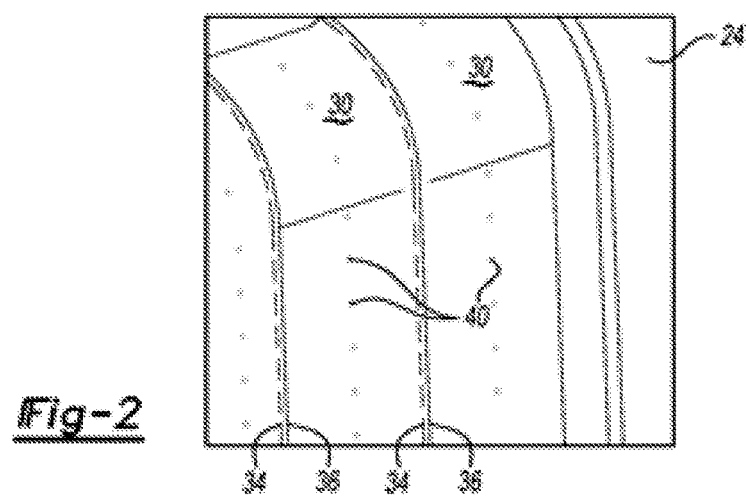
FIG. 2 schematically illustrates selected features of the example of FIG. 1.

As best appreciated in FIG. 2, the example vapor barrier tape 30 includes a plurality of vent holes or perforations 40 that allow for gas migration in a direction away from the CSA 20. In one embodiment where the vapor barrier tape 30 is formed of a polytetrafluoroethylene material, the plurality of vent holes 40 are separate and distinct from pores of the polytetrafluoroethylene material. Gases such as hydrogen or oxygen are allowed to escape from the CSA 20 through the vent holes 40 of the vapor barrier tape 30 assuming the CSA is idle. During fuel cell operation gases will not escape through the vent holes 40. The holes or perforations 40 are small enough so that vapor moisture is retained within the CSA 20 even when the CSA is idle.

The illustrated example arrangement is relatively inexpensive. No special tooling or processes are required for applying the vapor barrier tape 30. Appropriate selection of the materials for the vapor barrier tape 30 renders it an environmentally sound solution to the problem of how to maintain moisture within a CSA.

Another feature of the disclosed example is that if any portion of the vapor barrier tape 30 were damaged, it is easily repairable or replaceable. Such a repair can be made on site and without any special equipment.

The illustrated example will not poison a fuel cell and will not de-wet any fuel cell surfaces. Additionally, the illustrated example arrangement is easily configured or scaled for different CSA sizes or configurations.

The illustrated example also allows for selectively covering a CSA 20 using a particular tape configuration or application pattern to realize a desired moisture management effect.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of managing moisture within a cell stack assembly, comprising:

covering only an exterior surface of the cell stack assembly extending between ends of the cell stack assembly that are in contact with each of a pair of opposing end caps with a vapor barrier tape including a plurality of independent and distinct vapor barrier tape segments to thereby maintain moisture within the cell stack assembly, each vapor barrier tape segment having a portion interfacing with the exterior surface, and edges of each vapor barrier tape segment at least partially overlapping with edges of an adjacent vapor barrier tape segment to define an overlapped region, the edges of each vapor barrier tap segment and edges of each adjacent vapor barrier tap segment aligned parallel with a plane defined by a major surface of each of the pair of opposing end caps, the overlapped region continuously extending around an entirety of a perimeter of an exterior of the cell stack assembly and comprising a smaller portion of the vapor barrier tape segment relative to a non-overlapped portion of the vapor barrier segment that interfaces with the exterior surface of the cell stack assembly; and permitting gas to permeate the plurality of independent and distinct vapor barrier tape segments in a direction away from the cell stack assembly through a plurality of vent holes in each vapor barrier tape segment while retaining vapor moisture within the cell stack assembly, the plurality of vent holes being distinct from pores inherent to a material of each of the vapor barrier tape segments.

2. The method of claim 1, wherein covering the exterior surface of the cell stack assembly includes wrapping the vapor barrier tape around the exterior surface such that the vapor barrier tape does not interface with a plurality of side surfaces of each of the opposing end caps.

3. The method of claim 2, wherein covering the exterior surface of the cell stack assembly includes the vapor barrier tape contacting the major surface of each of the pair of opposing end caps.

4. The method of claim 3, wherein the exterior surface comprises four side surfaces and the method comprises covering each of the four side surfaces with the vapor barrier tape.

5. The method of claim 1, wherein the material of the vapor barrier tape is polytetraflouroethylene.

6. The method of claim 1, comprising adhering the vapor barrier tape to the exterior surface of the cell stack assembly.

7. The method of claim 1, comprising wrapping the vapor barrier tape around the cell stack assembly.

8. The method of claim 1, wherein the vapor barrier tape is hydrophobic.

9. The method of claim 1, further comprising positioning the vapor barrier segments adjacent to each other in a longitudinal direction of the cell stack assembly.

* * * * *